United States Patent [19]

Whalen et al.

[11] Patent Number: 4,855,357

[45] Date of Patent: Aug. 8, 1989

[54] LOW-TEMPERATURE IMPACT BLENDS OF POLYCARBONATE, GRAFT COPOLYMER AND RIGID COPOLYMER

[75] Inventors: David Whalen, Washington; Ronald L. Jalbert, Parkersburgh, both of W. Va.

[73] Assignee: General Electric Company, Pittsfield, Mass.

[21] Appl. No.: 256,856

[22] Filed: Oct. 12, 1988

[51] Int. Cl.$^4$ .............................................. C08L 69/00
[52] U.S. Cl. .......................................... 525/67; 525/69
[58] Field of Search .................... 525/67, 146, 148, 69

[56] References Cited

U.S. PATENT DOCUMENTS

| | | | |
|---|---|---|---|
| 3,130,177 | 4/1964 | Grabowski | 260/45.5 |
| 3,162,695 | 12/1964 | Grabowski | 260/873 |
| 3,239,582 | 3/1966 | Keskkula et al. | 260/873 |
| 3,649,712 | 3/1972 | Grabowski | 260/873 |
| 3,655,824 | 4/1972 | Kato et al. | 260/873 |
| 3,742,088 | 6/1973 | Holder et al. | 260/873 |
| 3,862,998 | 1/1975 | Koehler et al. | 260/873 |
| 3,947,524 | 3/1976 | Hozumi et al. | 260/873 |
| 3,988,389 | 10/1976 | Margotte et al. | 260/873 |
| 4,122,130 | 10/1978 | Fava | 260/873 |
| 4,204,047 | 5/1980 | Margotte et al. | 525/67 |
| 4,218,544 | 8/1980 | Henton | 525/67 |
| 4,444,950 | 4/1984 | Sakano et al. | 525/67 |
| 4,499,237 | 2/1985 | Tacke et al. | 525/67 |
| 4,526,926 | 7/1985 | Weber et al. | 525/67 |
| 4,622,363 | 11/1986 | Eichenauer et al. | 525/67 |
| 4,624,986 | 11/1986 | Weber et al. | 525/67 |
| 4,665,125 | 5/1987 | Kishida et al. | 525/67 |

*Primary Examiner*—Theodore Pertilla
*Attorney, Agent, or Firm*—Lowe, Price, LeBlanc, Becker & Shur

[57] ABSTRACT

Polymer blend compositions comprising a polycarbonate, a graft copolymer and a rigid copolymer exhibit improved low-temperature impact properties. The polycarbonate has a weight average molecular weight, Mw, not less than 35,000 and the rigid copolymer has a weight average molecular weight, Mw, not less than 130,000. The graft copolymer is formed from at least two ethylenically unsaturated monomers graft polymerized to a rubbery polymer substrate. The rigid copolymer is formed from at least two ethylenically unsaturated monomers and is compatible with the graft copolymer.

17 Claims, No Drawings

LOW-TEMPERATURE IMPACT BLENDS OF POLYCARBONATE, GRAFT COPOLYMER AND RIGID COPOLYMER

FIELD OF THE INVENTION

The present invention relates to polymer blend compositions which exhibit improved low-temperature impact properties and which comprise a polycarbonate polymer, a graft copolymer and a rigid copolymer.

BACKGROUND OF THE INVENTION

It is generally known that polycarbonate polymers have high impact strength but that the impact strength of these polymers decreases rapidly with decreasing temperatures and also after aging the polymers at elevated temperatures. These characteristics consequently limit the range of applications of polycarbonate polymers. Numerous attempts have been made to improve the impact strength and other properties of polycarbonate resins at low and/or high temperatures in order to increase their range of applications. For example, polycarbonates have been blended with various rubber graft copolymers in order to improve their overall properties.

Blends of polycarbonate with a graft copolymer are disclosed in the Grabowski U.S. Pat. No. 3,130,177 wherein the graft copolymers are prepared by the interaction under polymerizing conditions of a mixture of an alkenyl cyanide and a vinyl aromatic hydrocarbon exemplified, respectively, by acrylonitrile and styrene, with a polybutadiene latex. The Grabowski U.S. Pat. No. 3,162,695 discloses additional blends of polycarbonates with graft copolymers wherein the copolymer contains butadiene, methyl methacrylate and styrene. The Keskkula et al U.S. Pat. No. 3,239,582 also discloses blends of polycarbonate with an alkenyl aromatic polymer or copolymer. Additional blends of ABS graft polymer and polycarbonate and/or polysulfone polymers are disclosed in the Grabowski U.S. Pat. No. 3,649,712 in which the ABS graft polymer may include at least one copolymer blended with the graft polymer.

A variety of compositions comprising polycarbonate and a graft copolymer such as ABS and exhibiting specific improvements in one or more physical properties have also been disclosed. For example, the Kato et al U.S. Pat. No. 3,655,824 and the Hozumi et al U.S. Pat. No. 3,947,524 relate to compositions comprising a polycarbonate polymer and a graft polymer, which compositions are disclosed as exhibiting superior impact strength. The Margotte et al U.S. Pat. No. 3,988,389 and the Sakano et al U.S. Pat. No. 4,444,950 relate to compositions comprising a polycarbonate and a graft copolymer which are disclosed as exhibiting improved weld strength. The Weber et al U.S. Pat. Nos. 4,526,926 and 4,624,986 disclose compositions which comprise a polycarbonate and a rubber-modified copolymer such as ABS and which exhibit low gloss and color stability. The Henton U.S. Pat. No. 4,218,544 discloses blends comprising polycarbonate, a grafted and/or nongrafted rubber, and additional copolymers, which blends are disclosed as being particularly useful in the manufacture of molded parts exposed to high temperature during manufacture and use. The Eichenauer et al U.S. Pat. No. 4,622,363 discloses blend compositions comprising polycarbonates, graft polymers and other copolymers and a high molecular weight copolymer, which blends are disclosed as exhibiting improved heat distortion temperatures.

Additional blend compositions comprising polycarbonate polymers and one or more graft or other copolymers are disclosed in the Holder et al U.S. Pat. No. 3,742,088, the Koehler et al U.S. Pat. No. 3,862,998, the Fava U.S. Pat. No. 4,122,130, the Margotte et al U.S. Pat. No. 4,204,047 and the Tacke et al U.S. Pat. No. 4,499,237.

SUMMARY OF THE INVENTION

It is an object of the present invention to provide improved polymer blend compositions comprising polycarbonate and a graft polymer. More particularly, it is an object of the present invention to provide polymer blend compositions comprising polycarbonate and a graft copolymer, which compositions exhibit good ambient temperature impact properties and improved low temperature impact properties while maintaining the advantageous properties generally provided by polycarbonate polymers and graft polymers.

These and additional objects are provided by the blend compositions of the present invention which comprise a polycarbonate polymer, a graft copolymer and a rigid copolymer. The polycarbonate polymer has a weight average molecular weight, Mw, as measured by gel permeation chromatography techniques, of not less than 35,000. The graft copolymer is formed from at least two ethylenically unsaturated monomers graft polymerized to a rubbery polymer substrate. The rigid copolymer is formed from at least two ethylenically unsaturated monomers and is compatible with the graft copolymer. Additionally, the rigid copolymer has a weight average molecular weight, Mw, as measured by gel permeation chromatography techniques, of not less than 130,000. It has been discovered that blend compositions including these three components, namely the polycarbonate, the graft copolymer and the rigid copolymer as described exhibit good ambient temperature impact properties and improved low temperature impact properties.

These and additional objects and advantages will be more fully understood in view of the following detailed description.

DETAILED DESCRIPTION

The polymer blend compositions according to the present invention comprise three main components, namely a polycarbonate polymer, a graft copolymer and a rigid copolymer. It has been discovered that by carefully selecting the individual components for use in the blend compositions, improvements in low temperature impact are provided. Specifically, it has been discovered that by carefully controlling the compositions of the graft copolymer and the rigid copolymer and by carefully controlling the molecular weights of the polycarbonate and the rigid copolymer, blend compositions exhibiting improved low temperature impact properties are provided. Throughout the present specification, references to molecular weight are determined using gel permeation chromatography techniques. The specific procedures employed in the molecular weight determinations are described more fully in the examples.

The polycarbonate polymer which is employed in the blend compositions of the present invention has a weight average molecular weight, Mw, of not less than 35,000. The polycarbonate may comprise any polycarbonate homopolymer or copolymer known in the art.

Preferably, the polycarbonate polymer contains residues of aromatic diols containing aromatic groups such as phenylene, biphenylene, naphthalene, anthrylene and the like. Examples of dihydric phenols suitable for use in preparing the polycarbonate include the bis(-hydroxyphenyl) alkylidenes such as 2,2-bis-(4-hydroxyphenyl) propane, more commonly known as bisphenol-A; 2,4'-dihydroxydiphenylmethane; bis-(2-hydroxyphenyl) methane; 1,1-bis(4-hydroxyphenyl) ethane and other bisphenol-A type diols known in the art, as well as the corresponding aromatically substituted or aliphatically substituted dihydric phenols wherein the substituents may comprise halogen, alkyl, acyl, carboxylate ester, sulfonate ester and the like groups. Of the foregoing, polycarbonates comprising homopolymers or copolymers of bisphenol-A and halogenated bisphenol-A are preferred. Additionally, the polycarbonate polymer may comprise a blend of two or more polycarbonate polymers or copolymers, in which case the weight average molecular weight Mw of the polycarbonate component is the molecular weight of the resulting polycarbonate polymer blend.

The graft copolymer component which is included in the blend compositions of the invention comprises a graft portion formed from at least two ethylenically unsaturated monomers and a rubbery polymer substrate. Suitable substrates include polymers and copolymers of one or more conjugated dienes, copolymers of conjugated dienes and non-diene vinyl monomers, alkylacrylate polymers, and copolymers of ethylenically unsaturated olefins and nonconjugated diene polymer (EPDM) rubbers. Preferred substrate polymers comprise polybutadiene, polybutadienestyrene, polybutylacrylate and ethylene-propylenenorborene polymers. A particularly preferred substrate polymer comprises polybutadiene.

The grafted portion of the graft copolymer is formed from at least two ethylenically unsaturated monomers. Suitable monomers include vinyl aromatics such as styrene, substituted vinyl aromatics such as halogen and/or alkyl substituted vinyl aromatics, acrylonitrile, substituted acrylonitriles, acrylates, alkyl substituted acrylates, methacrylates, alkyl substituted methacrylates, and ethylenically unsaturated carboxylic acids, diacids, dianhydrides, acid esters, diacid esters, amides, imides and N-substituted imides. Preferably, the monomers which form the graft portion of the graft copolymer are selected from the group consisting of styrene, alpha-methylstyrene, dibromostyrene, methyl methacrylate, acrylonitrile, maleic anhydride, maleimide, N-phenyl maleimide and acrylamide. In a more preferred embodiment, the graft portion is formed from at least one first monomer selected from the group consisting of styrene, alpha-methylstyrene, dibromostyrene and methyl methacrylate, and at least one second, different monomer selected from the group consisting of acrylonitrile, methyl methacrylate, maleic anhydride, maleimide, N-phenyl maleimide and acrylamide. In such cases, it is preferred that the graft portion is formed from about 60 to about 95 weight percent, and more preferably 60 to 80 weight percent, of the first monomer and from about 5 to about 40 weight percent, and more preferably 20 to 40 weight percent, of the second monomer. A preferred graft portion comprises styrene and acrylonitrile.

The graft copolymer may be produced by any method known in the art, for example, emulsion, bulk, mass or suspension polymerization processes. It is preferred that the graft copolymer contains from about 10 to 90 weight percent of the rubbery substrate polymer and from about 10 to 90 weight percent of the graft portion, based on the rubbery substrate and the graft portion. More preferably, the graft copolymer comprises from about 40 to about 80 weight percent of the rubbery substrate polymer and from about 20 to about 60 weight percent of the graft portion, based on the rubbery substrate and the graft portion.

The third main component of the blend compositions according to the present invention comprises the rigid copolymer which is formed from at least two ethylenically unsaturated monomers and is compatible with the graft copolymer. Additionally, the rigid copolymer has a weight average molecular weight, Mw, of not less than 130,000. The rigid copolymer may comprise a blend of two or more copolymers, in which case the weight average molecular weight of the resulting polymer blend is not less than 130,000.

The rigid copolymer may be formed from two or more ethylenically unsaturated monomers such as vinyl aromatics, substituted vinyl aromatics such as halogen and/or alkyl substituted vinyl aromatics, acrylonitrile, substituted acrylonitriles, acrylates, methacrylates, alkylacrylates, alkylmethacrylates, and ethylenically unsaturated carboxylic acids, diacids, dianhydrides, acid esters, diacid esters, amides, imides and N-substituted imides. Preferably, the rigid polymer is formed from at least two monomers selected from the group consisting of styrene, alpha-methylstyrene, dibromostyrene, methyl methacrylate, acrylonitrile, maleic anhydride, maleimide, N-phenylmaleimide and acrylamide. More preferably, the rigid copolymer is formed from at least one first monomer selected from styrene, alpha-methylstyrene, dibromostyrene and methyl methacrylate, and at least one second, different monomer selected from acrylonitrile, methacrylonitrile, methyl methacrylate, maleic anhydride, maleimide, N-phenyl maleimide and acrylamide. In such cases, it is preferred that the rigid copolymer is formed from about 60 to about 95 weight percent of the first monomer and from about 5 to about 40 weight percent of the second monomer. A preferred rigid copolymer comprises styrene and acrylonitrile. The rigid copolymer may be prepared by any method known in the art including emulsion, bulk, mass and suspension polymerization processes.

Examples of preferred rigid copolymers and preferred graft portions of the graft copolymers include the following: styrene-acrylonitrile; styrene-acrylonitrile-maleic anhydride; styrene-alpha-methylstyrene-acrylonitrile; styrene-alpha-methylstyrene-acrylonitrile-N-phenylmaleimide; styrene-acrylonitrile-N-phenylmaleimide; styrene-acrylonitrile-N-phenylmaleimidemaleic anhydride; styrene-methyl methacrylateacrylonitrile; styrene-methyl methacrylate-acrylonitrilemaleic anhydride; styrene-methyl methacrylate-alpha-methylstyrene-acrylonitrile; styrene-methyl methacrylate-alpha-methylstyrene-acrylonitrile-N-phenyl maleimide; styrene -methyl methacrylate-acrylonitrile-N-phenyl maleimide; styrene-methyl methacrylateacrylonitrile-N-phenyl maleimide-maleic anhydride; styrene-dibromostyrene-acrylonitrile; styrene-dibromostyrene-acrylonitrile-maleic anhydride; styrene-dibromostyrene-alpha-methylstyrene-acrylonitrile; and styrene-dibromostyrene-acrylonitrile-N-phenyl maleimide.

The three main components included in the blend compositions of the invention, namely the polycarbonate, the graft copolymer and the rigid copolymer, are included in amounts such that the blend compositions exhibit improved low temperature impact properties. Preferably, the blend compositions comprise from about 10 to about 90 percent by weight of the polycarbonate polymer, from about 1 to about 80 percent by weight of the graft copolymer, and from about 5 to about 80 percent by weight of the rigid copolymer, based on the polycarbonate, the graft copolymer and the rigid copolymer components. More preferably, the blend compositions comprise from about 40 to about 80 weight percent of the polycarbonate, from about 5 to about 50 weight percent of the graft polymer, and from about 5 to about 50 weight percent of the rigid copolymer, based on the polycarbonate, graft and rigid components. The blend compositions may be prepared by conventional mixing techniques such as admixing granular or particulate polymeric components and heat plastifying the resulting mixture. For example, a blend of the polycarbonate, the graft copolymer and the rigid copolymer may be prepared and fed into a heat fabricating apparatus such as a screw extruder or a reciprocating screw injection molding machine.

The blend compositions according to the present invention may include, in addition to the three main polymeric components, conventional additives known in the art. For example, the blend compositions may include additives such as stabilizers, lubricants, plasticizers, antioxidants, fire retardants, fillers and/or reinforcing fibers such as glass fibers, pigments and the like.

The following examples further demonstrate the blend compositions according to the present invention. Unless otherwise indicated, the blend compositions of the examples were prepared by tumble blending the three main components and extruding the resulting mixture on a 28mm-WP ZSK twin screw extruder at barrel temperatures of 400° F. for zone 1 and 450° to 500° F. for zones 2-6 and a screw speed of 150 to 175 rpm. The extrudate was pelletized, dried and injection molded into test specimens at a stock temperature of 500° to 550° F.

Unless otherwise indicated, throughout the examples, parts and percentages are by weight. The following additional abbreviations are also used in the examples:

G-1: A graft copolymer comprising 50 parts polybutadiene grafted with 35 parts styrene and 15 parts acrylonitrile.

PC-1: Polycarbonate of bisphenol-A, Mw of 37,000.
PC-2: Polycarbonate of bisphenol-A, Mw of 35,000.
PC-3: Polycarbonate of bisphenol-A, Mw of 41,000.
PC-4: Polycarbonate of bisphenol-A, Mw of 35,000.
PC-5: Polycarbonate of bisphenol-A, Mw of 30,600.
PC-6: Polycarbonate of bisphenol-A, Mw of 41,000.
PC-7: A 25/75 blend of PC-5 and PC-6, Mw of 38,400.
PC-8: A 50/50 blend of PC-5 and PC-6, Mw of 35,600.
PC-9: A 75/25 blend of PC-5 and PC-6, Mw of 32,700.

R-1: 75/25 copolymer of styrene and acrylonitrile, Mw of 102,000.

R-2: 72/28 copolymer of styrene and acrylonitrile, Mw of 110,000.

R-3: A 50/50 blend of R-1 and R-2, Mw of 107,000, prepared by solvent mixing in chloroform and drying.

R-4: 72/28 copolymer of styrene and acrylonitrile, Mw of 154,000.

R-5: A 50/50 blend of R-1 and R-4, Mw of 130,000, prepared by solvent mixing in chloroform and drying.

R-6: A 50/50 blend of R-2 and R-4, Mw of 136,000, prepared by solvent mixing in chloroform and drying.

TNPP: Trinonyl phenyl phosphite.
FN-510: Microthenene FN 510 (polyethylene).

Throughout the examples the following test procedures were employed unless otherwise indicated:

Izod Impact: According to ASTM-D256 at the indicated temperature using a sample size of $\frac{1}{8}$-inch×$\frac{1}{2}$-inch.

Dart Impact: Measured total energy absorbed by the impact using a sample thickness of $\frac{1}{8}$-inch, a $\frac{1}{2}$-inch tup, a 1.5-inch test area and an 8.75 ft/s impact speed. The tested specimens were visually examined after testing to determine the mode of failure. Failures were classified as ductile if the sample showed evidence of elastic deformation, no loose shards were expelled from the sample and fractures on the specimen did not extend greater than 0.5 inches from the center of the impact area.

Molecular Weight: According to gel permeation chromatography techniques employing a Dupont 870 pump with a Dupont UV detector at 254 nm, Dupont KX chromatography columns containing porous silicon microsphere (PSM) with a bimodal porous size maintained at 40° C., a flow rate of 1 ml/min, and a 20 µl sample size of 0.2 percent concentration (weight to volume) in chloroform with 1 percent carbowax. The calibration standard for rigid polymers was a broad molecular weight distribution copolymer of 72/28 styrene/acrylonitrile, Mw of 150,000 and Mw/Mn of 2.0. The calibration standard for polycarbonate was a broad standard from Scientific Polymer Products, Inc., No. 035C, Mw of 47,900 and Mw/Mn of 2.6.

EXAMPLE 1

In this example, blend compositions C and F according to the present invention were prepared while compositions A, B, D and E were prepared for comparison. The compositions were subjected to notched Izod impact testing at 73° F. and −20° F. The compositions and the Izod impact measurements are set forth in Table I.

TABLE I

|  | A | B | C | D | E | F |
|---|---|---|---|---|---|---|
| PC-1 | 50 | 50 | 50 | 0 | 0 | 0 |
| PC-6 | 0 | 0 | 0 | 50 | 50 | 50 |
| G-1 | 15 | 15 | 15 | 15 | 15 | 15 |
| R-1 | 35 | 0 | 0 | 35 | 0 | 0 |
| R-2 | 0 | 35 | 0 | 0 | 35 | 0 |
| R-4 | 0 | 0 | 35 | 0 | 0 | 35 |
| TNPP | 0.25 | 0.25 | 0.25 | 0.25 | 0.25 | 0.25 |
| FN-510 | 1 | 1 | 1 | 1 | 1 | 1 |
| Rigid Mw/1000 | 102 | 110 | 154 | 102 | 110 | 154 |
| PC Mw/1000 | 37 | 37 | 37 | 41 | 41 | 41 |
| Notched Izod Impact, ft-lb/inch |  |  |  |  |  |  |
| 73° F. | 7.6 | 7.0/7.9 | 7.3 | 8.7 | 8.4 | 8.2 |
| −20° F. | 2.4 | 2.1/2.3 | 3.8 | 3.7 | 3.7 | 5.7 |

The results set forth in Table I demonstrate that all of compositions A–F exhibited good impact strengths at an ambient temperature of 73° F. However, the results set forth in Table I further demonstrate that the compisitions C and F according to the present invention including both a polycarbonate polymer having a weight average molecular weight not less than 35,000 and a rigid copolymer having a weight average molecular weight not less than 130,000 exhibited significantly improved low temperature impact strengths as compared with compositions A–B and D–E, respectively. This example therefore demonstrates the improvements in low-temperature impact properties provided by the compositions of the present invention.

EXAMPLE 2

In this example, compositions J, K and L were prepared according to the present invention and the compositions G, H, I and M were prepared for comparison. Compositions J–L included both a polycarbonate polymer having a weight average molecular weight not less than 35,000 and a rigid copolymer having a weight average molecular weight not less than 130,000. On the other hand, comparative compositions G–I contained a rigid copolymer having a weight average molecular weight less than 130,000 while comparative composition M contained both a polycarbonate having a weight average molecular weight less than 35,000 and a rigid copolymer having a weight average molecular weight less than 130,000. The compositions were subjected to measurement of the Izod impact at room temperature, −20° F. and −40° F. and to the measurement of Dart impact at −20° F. The compositions and testing results are set forth in Table II

TABLE II

|  | G | H | I | J | K | L | M |
|---|---|---|---|---|---|---|---|
| PC-6 | 60 | 60 | 60 | 60 | 60 | 60 | — |
| PC-5 | — | — | — | — | — | — | 60 |
| G-1 | 12 | 12 | 12 | 12 | 12 | 12 | 12 |
| R-1 | 28 | — | — | — | — | — | 28 |
| R-2 | — | — | 28 | — | — | — | — |
| R-3 | — | 28 | — | — | — | — | — |
| R-4 | — | — | — | — | — | 28 | — |
| R-5 | — | — | — | 28 | — | — | — |
| R-6 | — | — | — | — | 28 | — | — |
| SAN Mw/1000 | 102 | 107 | 110 | 130 | 136 | 154 | 102 |
| Izod Impact, ft-lb/inch |  |  |  |  |  |  |  |
| Room Temperature | 17.3 | 15.2 | 15.5 | 13.7 | 14.5 | 13.7 | 10.0 |
| −20° F. | 2.4 | 3.0 | 2.6 | 11.3 | 11.1 | 10.1 | 2.7 |
| −40° F. | 3.2 | 4.1 | 2.6 | 4.0 | 10.2 | 4.2 | 3.0 |
| Instrumented Dart Impact, ft-lb, −20° F. |  |  |  |  |  |  |  |
| Total Energy | 37 | 40 | 35 | 34 | 37 | 29 | 24 |
| % Ductile Samples | 60 | 100 | 60 | 100 | 100 | 100 | 0 |

The results set forth in Table II demonstrate that all of compositions G–M exhibited good impact strength at room temperature. However, compositions J, K and L according to the present invention exhibited significantly improved impact strengths at −20° F. as compared with comparative compositions G–I and M. Additionally, the Dart impact testing of compositions J–I according to the present invention indicated that the compositions exhibited an advantageous ductile failure.

The preceding examples are set forth to demonstrate specific embodiments of the invention and are not intended to limit the scope of the presently claimed compositions. Additional embodiments and advantages within the scope of the claimed invention will be apparent to one of ordinary skill in the art.

What is claimed is:
1. A polymer blend composition, comprising
 (a) a polycarbonate polymer having a weight average molecular weight, Mw, as measured by gel permeation chromatography techniques, of not less than 35,000;
 (b) a graft copolymer formed from at least two ethylenically unsaturated monomers graft polymerized to a rubbery polymer substrate; and
 (c) a rigid copolymer formed from at least two ethylenically unsaturated monomers, the rigid copolymer being compatible with the graft copolymer and having a weight average molecular weight, Mw, as measured by gel permeation chromatography techniques, of not less than 130,000.

2. A polymer blend composition as defined by claim 1, comprising from about 10 to about 90 percent by weight of the polycarbonate polymer, from about 1 to about 80 percent by weight of the graft copolymer, and from about 5 to about 80 percent by weight of the rigid copolymer, based on the polycarbonate, graft and rigid components.

3. A polymer blend composition as defined by claim 2, comprising from about 40 to about 80 percent by weight of the polycarbonate, from about 5 to about 50 weight percent of the graft polymer, and from about 5 to about 50 weight percent of the rigid copolymer, based on the polycarbonate, graft and rigid components.

4. A polymer blend composition as defined by claim 1, wherein the polycarbonate polymer comprises a homopolymer or copolymer of bisphenol-A.

5. A polymer blend composition as defined by claim 1, wherein the polycarbonate polymer comprises a homopolymer or copolymer of halogenated bisphenol-A.

6. A polymer blend composition as defined by claim 1, wherein the graft copolymer comprises a rubbery polymer substrate selected from the group consisting of polybutadiene, polybutadiene-styrene, polybutylacrylate and ethylene-propylene-norborene polymers.

7. A polymer blend composition as defined by claim 6, wherein the rubbery polymer substrate comprises polybutadiene.

8. A polymer blend composition as defined by claim 1, wherein the graft copolymer comprises a graft portion formed from at least two ethylenically unsaturated monomers selected from the group consisting of styrene, alpha-methylstyrene, dibromostyrene, methyl methacrylate, acrylonitrile, maleic anhydride, maleimide, N-phenyl maleimide and acrylamide.

9. A polymer blend composition as defined by claim 8, wherein the graft portion is formed from at least one first monomer selected from the group consisting of styrene, alpha-methylstyrene, dibromostyrene and methyl methacrylate, and at least one second different monomer selected from the group consisting of acrylonitrile, methyl methacrylate, maleic anhydride, maleimide, N-phenyl maleimide and acrylamide.

10. A polymer blend composition as defined by claim 9, wherein the graft portion is formed from styrene and acrylonitrile.

11. A polymer blend composition as defined by claim 9, wherein the graft portion is formed from about 60 to about 95 weight percent of the first monomer and from about 5 to about 40 weight percent of the second monomer.

12. A polymer blend composition as defined by claim 1, wherein the graft copolymer comprises from about 40 to about 80 weight percent of the rubbery substrate polymer and from about 20 to about 60 weight percent of the graft portion, based on the rubbery substrate and the graft portion.

13. A polymer blend composition as defined by claim 1, wherein the rigid copolymer is formed from at least two ethylenically unsaturated monomers selected from the group consisting of styrene, alpha-methyl styrene, dibromostyrene, methyl methacrylate, acrylonitrile, maleic anhydride, maleimide, N-phenyl maleimide and acrylamide.

14. A polymer blend composition as defined by claim 13, wherein the rigid copolymer is formed from at least one first monomer selected from the group consisting of styrene, alpha-methylstyrene, dibromostyrene, and methyl methacrylate, and at least one second different monomer selected from the group consisting of acrylonitrile, methyl methacrylate, maleic anhydride, maleimide, N-phenyl maleimide and acrylamide.

15. A polymer blend composition as defined by claim 14, wherein the rigid copolymer is formed from styrene and acrylonitrile.

16. A polymer blend composition as defined by claim 14, wherein the rigid copolymer is formed from about 60 to about 95 weight percent of the first monomer and from about 5 to about 40 weight percent of the second monomer.

17. A polymer blend composition, comprising
(a) from about 40 to about 80 weight percent of a polycarbonate polymer having a weight average molecular weight, Mw, as measured by gel permeation chromatography techniques, of not less than 35,000;
(b) from about 5 to about 50 weight percent of a graft copolymer comprising a butadiene substrate and a graft portion formed from styrene and acrylonitrile; and
(c) from about 5 to about 50 weight percent of a rigid copolymer formed from styrene and acrylonitrile, the rigid copolymer having a weight average molecular weight, Mw, as measured by gel permeation techniques, of not less than 130,000.

* * * * *